J. D. HILL.
Corn Gatherer and Husker.

No. 68,507.  Patented Sept. 3, 1867.

Witnesses:
Theo Tusche
Wm Trevern

Inventor:
J. D. Hill
Per Munn

United States Patent Office.

J. D. HILL, OF FORT SCOTT, KANSAS.

Letters Patent No. 68,507, dated September 3, 1867.

---

IMPROVEMENT IN GATHERING AND HUSKING CORN.

---

The Schedule referred to in these Letters Patent and making part of the same.

---

TO ALL WHOM IT MAY CONCERN:

Be it known that I, J. D. HILL, of Fort Scott, in the county of Bourbon, and State of Kansas, have invented a new and improved Machine for Husking and Gathering Corn; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved machine by means of which corn may be gathered and husked automatically as the machine is drawn through the field; and it consists in the manner of removing the husks from the corn, and in the construction, combination, and arrangement of the parts of the machine, as hereinafter more fully described.

Figure 1:
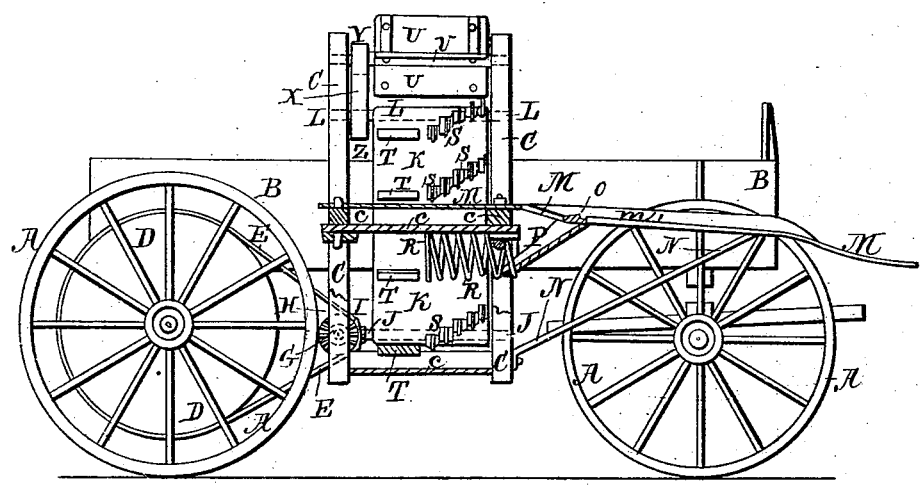
Figure 1 is a side view of my improved device attached to a wagon, partly in section through the line $x$ $x$, fig. 2.
Figure 2:
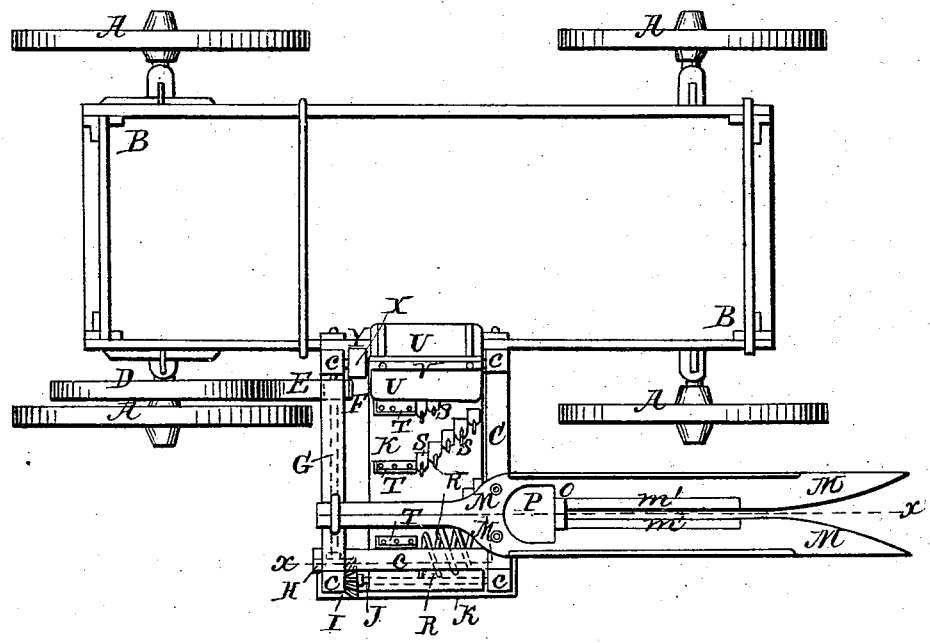
Figure 2 is a top view of the same.

A are the wheels and B is the box of an ordinary wagon to which my improvement has been attached. C is a strong wooden frame, firmly but removably attached to the box B, between the front and rear wheels, as shown in figs. 1 and 2. D is a large pulley, securely and removably attached to one of the rear wheels A of the wagon so as to be carried with the said wheel in its revolution. E is a band passing around the pulley D and around the pulley F attached to the shaft G, which revolves in bearings in the frame C, and has a bevel gear-wheel, H, attached to its other or outer end. The teeth of the bevel gear-wheel H mesh into the teeth of the bevel gear-wheel I, attached to the end of the shaft J, which revolves in bearings at the lower part of the outer side of the frame C. K is a belt or endless apron, which passes around the shaft J and around the shaft L, which revolves in bearings in the frame C, and which is placed a little above the upper edge of the box B so that the band or endless apron K may stand at about an angle of forty-five degrees, (45°.) M are guides, the rear parts of which are securely attached to the frame C, and the forward parts of which are supported by braces N, the rear ends of which are attached to the lower part of the frame C. The forward ends of the guides M are forked, as shown in fig. 2, so as to collect and guide the stalks into the narrow channel or space between the said guides. The inner edges of the guides have upwardly curved or cutting edges $m'$ formed upon or attached to them, which, as the stalks pass back between them, cut the husks at the base of the ears. O is a knife, attached to the guides M at the rear end of the channel between them, which said knife severs the ear from the stalk. The ear, when cut off by the knife O, falls into the spout P, by which it is guided into the receptacle R, which is formed of wire, coiled spirally, which is secured to the frame C in a horizontal position, and which is of such a size as to allow the ear to easily pass through it longitudinally. S are hooked teeth, with sharp edges attached to the forward half of the endless apron K, in inclined rows, as shown in figs. 1 and 2, and which are so arranged as to enter between the coils of the receptacle R and catch upon and remove the husks from the ear at the same time that they move the ear along through the said receptacle, so that it may pass therefrom with the husks entirely removed. As the husked ear escapes from the receptacle R it is received upon the buckets T attached to the rear part or half of the endless apron K in a horizontal position, by which the ears are carried up the said inclined apron and allowed to fall into the wagon-box B. U are fans attached to a shaft, V, which revolves in bearings in the upper part of the frame C, and which is driven by the band X passing around the pulley Y attached to the fan-shaft V, and around the pulley Z attached to the shaft L, as shown in fig. 1.

This device is designed to blow off any strips of husks or other extraneous matter that may be adhering to the ears. The lower part of the frame C may be encased so as to catch any ears that may escape from the buckets T. The entire device being removably attached to the wagon may be removed when not required for use, and laid aside, leaving the wagon to be used for the ordinary purposes of a farm-wagon.

I claim as new, and desire to secure by Letters Patent—

1. Removing the husks from the ears of corn substantially in the manner herein shown and described, that is to say, by means of hooked teeth, with cutting edges, attached to an endless apron or belt.

2. The combination of the belt or endless apron K, having hooked teeth S and buckets T attached to it, the shafts J and L, and receptacle R, with each other and with the frame C, substantially as herein shown and described and for the purpose set forth.

3. The combination of the pulley D, band E, pulley F, shaft G, and bevel gear-wheels H and I, with each other, with the wheel A, frame C, and shaft J, for the purpose of imparting motion to the endless apron K, substantially as herein shown and described and for the purpose set forth.

4. The combination of the guides M, constructed as described, knife O, and spout P, with each other, with the frame C and receptacle R, substantially as herein shown and described and for the purpose set forth.

5. The combination of the fans U, shaft V, pulleys Y and Z, and belt X, with each other and with the shaft L, frame C, and endless apron K, substantially as herein shown and described and for the purpose set forth.

J. D. HILL.

Witnesses:
  GEO. J. CLARK,
  T. F. ROBLEY.